(12) United States Patent
Saito

(10) Patent No.: US 12,362,581 B2
(45) Date of Patent: Jul. 15, 2025

(54) ELECTRONIC DEVICE, CONNECTION DEVICE, SYSTEM, POWER SUPPLY METHOD, AND POWER SUPPLY PROGRAM

(71) Applicant: FUJIFILM Corporation, Tokyo (JP)

(72) Inventor: Junichi Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 521 days.

(21) Appl. No.: 17/816,974

(22) Filed: Aug. 2, 2022

(65) Prior Publication Data

US 2023/0064923 A1 Mar. 2, 2023

(30) Foreign Application Priority Data

Aug. 26, 2021 (JP) .................. 2021-138408

(51) Int. Cl.
*H02J 7/00* (2006.01)
*H02J 9/06* (2006.01)

(52) U.S. Cl.
CPC .......... *H02J 7/0063* (2013.01); *H02J 7/0013* (2013.01); *H02J 7/0031* (2013.01); *H02J 7/007* (2013.01); *H02J 9/061* (2013.01)

(58) Field of Classification Search
CPC ........ H02J 7/0063; H02J 7/0031; H02J 7/007; H02J 7/0013; H02J 9/061
USPC .................. 320/107, 114, 122, 135
See application file for complete search history.

(56) References Cited

U.S. PATENT DOCUMENTS

| | | | |
|---|---|---|---|
| 2003/0011704 A1 | 1/2003 | Sawachi | |
| 2005/0162132 A1* | 7/2005 | Nagasawa | H02J 9/061 |
| | | | 320/128 |
| 2013/0272691 A1* | 10/2013 | Yamaguchi | H02J 1/108 |
| | | | 323/350 |
| 2019/0181509 A1* | 6/2019 | Ohtsuka | H02J 7/00 |
| 2019/0273392 A1* | 9/2019 | Maeda | H02J 7/00 |
| 2019/0280516 A1* | 9/2019 | Shimaya | H02J 7/34 |
| 2022/0344965 A1* | 10/2022 | Saito | H02J 7/0063 |

FOREIGN PATENT DOCUMENTS

| | | |
|---|---|---|
| JP | 2001-298645 A | 10/2001 |
| JP | 2001-352477 A | 12/2001 |
| JP | 2003-018441 A | 1/2003 |
| JP | 2007-259383 A | 10/2007 |
| JP | 2007-310005 A | 11/2007 |

(Continued)

OTHER PUBLICATIONS

An Office Action; "Notice of Reasons for Refusal," mailed by the Japanese Patent Office on Mar. 25, 2025.

*Primary Examiner* — Edward Tso
*Assistant Examiner* — Aaron Piggush
(74) *Attorney, Agent, or Firm* — Studebaker Brackett PLLC

(57) ABSTRACT

A digital camera includes a first battery, a power supply circuit, and a power supply management unit, and an accessory having second batteries and a communication unit is connectable to the digital camera. The power supply management unit performs control to supply power to the communication unit from the first battery and to supply power to the power supply circuit from any one of the second batteries, in a state in which the accessory is connected, and performs control to supply power to the power supply circuit from the first battery in a state in which the accessory is not connected.

20 Claims, 8 Drawing Sheets

(56) References Cited

FOREIGN PATENT DOCUMENTS

| JP | 2010-183799 A | 8/2010 |
| JP | 2014-016573 A | 1/2014 |
| JP | 2021-093911 A | 6/2021 |

* cited by examiner

ELECTRONIC DEVICE, CONNECTION DEVICE, SYSTEM, POWER SUPPLY METHOD, AND POWER SUPPLY PROGRAM

CROSS-REFERENCE TO RELATED APPLICATIONS

The present application claims priority under 35 U.S.C. § 119 to Japanese Patent Application No. 2021-138408 filed on Aug. 26, 2021. Each of the above application is hereby expressly incorporated by reference, in its entirety, into the present application.

BACKGROUND OF THE INVENTION

1. Field of the Invention

The present invention relates to an electronic device, a connection device, a system, a power supply method, and a power supply program.

2. Description of the Related Art

JP2007-259383A discloses a wireless communication device that is attachable to and detachable from an imaging device including a mode selection switch that is used to select any one of a plurality of operation modes, an imaging device-side battery, and a power switch. This wireless communication device comprises a wireless communication processing unit that performs transmission/reception processing of image data with respect to an external device, a wireless communication device-side battery that supplies power, an operation mode determination unit that discriminates which operation mode is selected by the mode selection switch, and a first power supply controller that stops supplying power to the wireless communication processing unit from the wireless communication device-side battery according to the operation mode discriminated by the operation mode determination unit.

JP2014-016573A discloses an imaging device including an imaging device main body having an imaging function and a strobe unit that is attachable to and detachable from the imaging device main body. The imaging device main body comprises an imaging device main body power supply that supplies power to the imaging device main body and the strobe unit. The strobe unit comprises a strobe device that emits strobe light, a controller that controls an operation of the strobe device, a strobe unit power supply unit that supplies power to the strobe device and the controller, and an attachment determination unit that determines an attachment state to the imaging device main body. The strobe device and the controller are operated by the power of the strobe unit power supply unit in a case where the attachment determination unit determines that the strobe unit is not attached to the imaging device main body, and the strobe device and the controller are operated by the power of the imaging device main body power supply in a case where the attachment determination unit determines that the strobe unit is attached to the imaging device main body.

JP2021-093911A discloses an electronic device to which a connection device is connectable. The electronic device comprising a first power feed unit that is capable of receiving external power or internal power supplied from a first battery provided in the electronic device and that outputs the external power in preference to the internal power, an external power feed connection unit that connects a power feed path of the external power to the first power feed unit, to a power feed path of the external power to a second power feed unit which is provided in the connection device and which feeds power to the electronic device from the connection device, and a selection unit that selects one out of the first power feed unit and the second power feed unit, as a supply source for power used by the electronic device is disclosed.

SUMMARY OF THE INVENTION

According to one embodiment of the technique of the present disclosure, there is provided an electronic device to which a connection device having a second battery and a first circuit is connectable, the electronic device comprising: a first battery; a power supply circuit; and a processor, in which the processor performs control to supply power to the first circuit from the first battery and to supply power to the power supply circuit from the second battery, in a state in which the connection device is connected, and performs control to supply power to the power supply circuit from the first battery in a state in which the connection device is not connected.

According to one embodiment of the technique of the present disclosure, there is provided an electronic device to which a connection device having a second battery and a first circuit is connectable, the electronic device comprising: a first battery; a power supply circuit; and a processor, in which the processor performs control to supply power to the first circuit from only the first battery out of the first battery and the second battery in a state in which the connection device is connected.

According to one embodiment of the technique of the present disclosure, there is provided a connection device that is connectable to an electronic device having a first battery and a power supply circuit, the connection device comprising: a second battery; and a first circuit, in which power is supplied to the first circuit from the first battery, and power is supplied to the power supply circuit from the second battery, in a state in which the connection device is connected to the electronic device.

According to one embodiment of the technique of the present disclosure, there is provided a system comprising: an electronic device having a first battery and a power supply circuit; a connection device that has a second battery and a first circuit and is connectable to the electronic device; and a processor, in which the processor performs control to supply power to the first circuit from the first battery and to supply power to the power supply circuit from the second battery, in a state in which the connection device is connected to the electronic device.

According to one embodiment of the technique of the present disclosure, there is provided a power supply method comprising: a step of performing control to supply power to a first circuit from a first battery and to supply power to a power supply circuit from a second battery, in a state in which a connection device having the second battery and the first circuit is connected to an electronic device having the first battery and the power supply circuit.

According to one embodiment of the technique of the present disclosure, there is provided a power supply program causing a processor to execute: a step of performing control to supply power to a first circuit from a first battery and to supply power to a power supply circuit from a second battery, in a state in which a connection device having the second battery and the first circuit is connected to an electronic device having the first battery and the power supply circuit.

DESCRIPTION OF THE PREFERRED EMBODIMENTS

Figure 1:
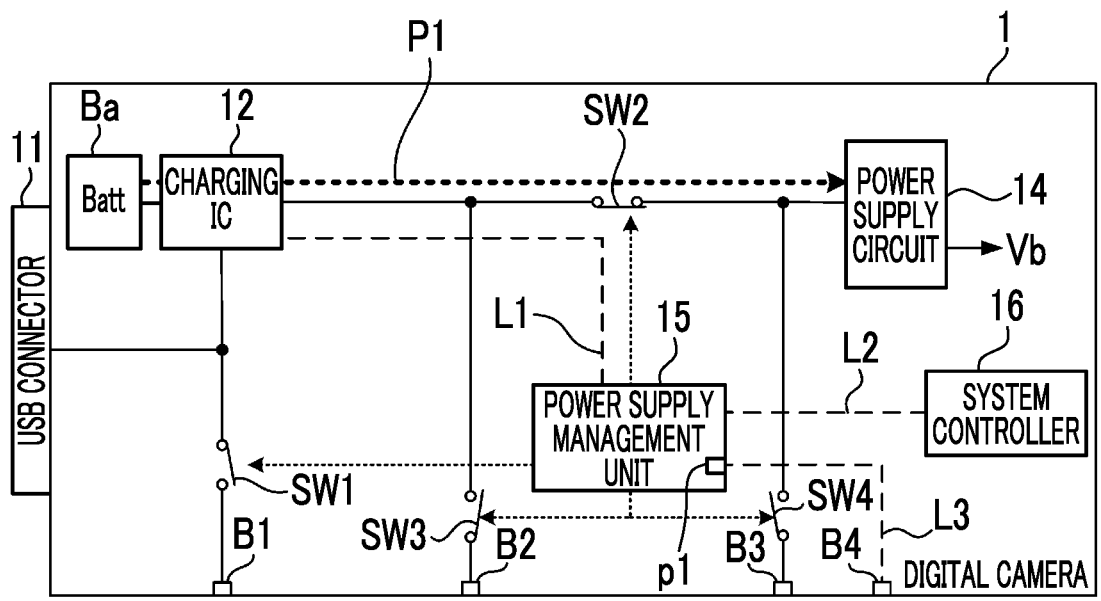
FIG. 1 is a schematic diagram showing a schematic configuration of a camera system 100 including one embodiment of each of an electronic device and a connection device of an embodiment of the present invention.
Figure 1:
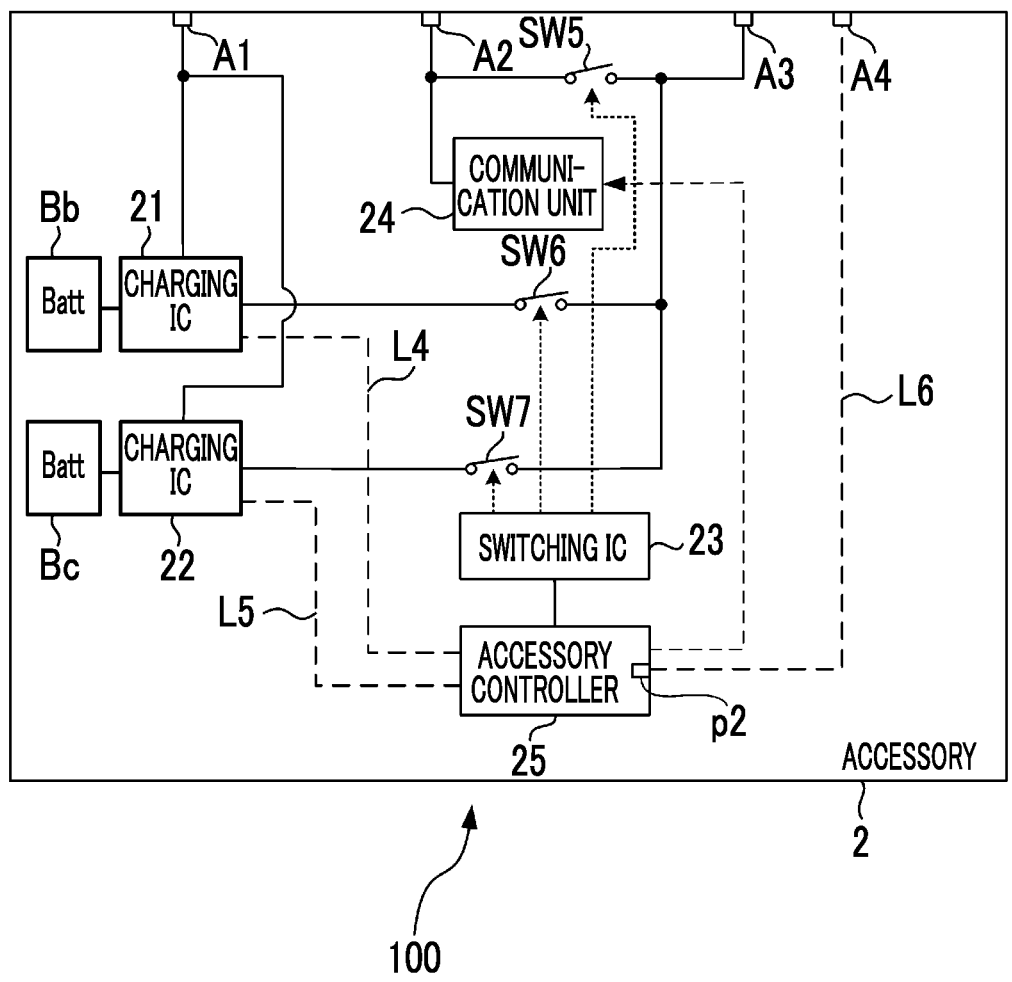
Figure 2:
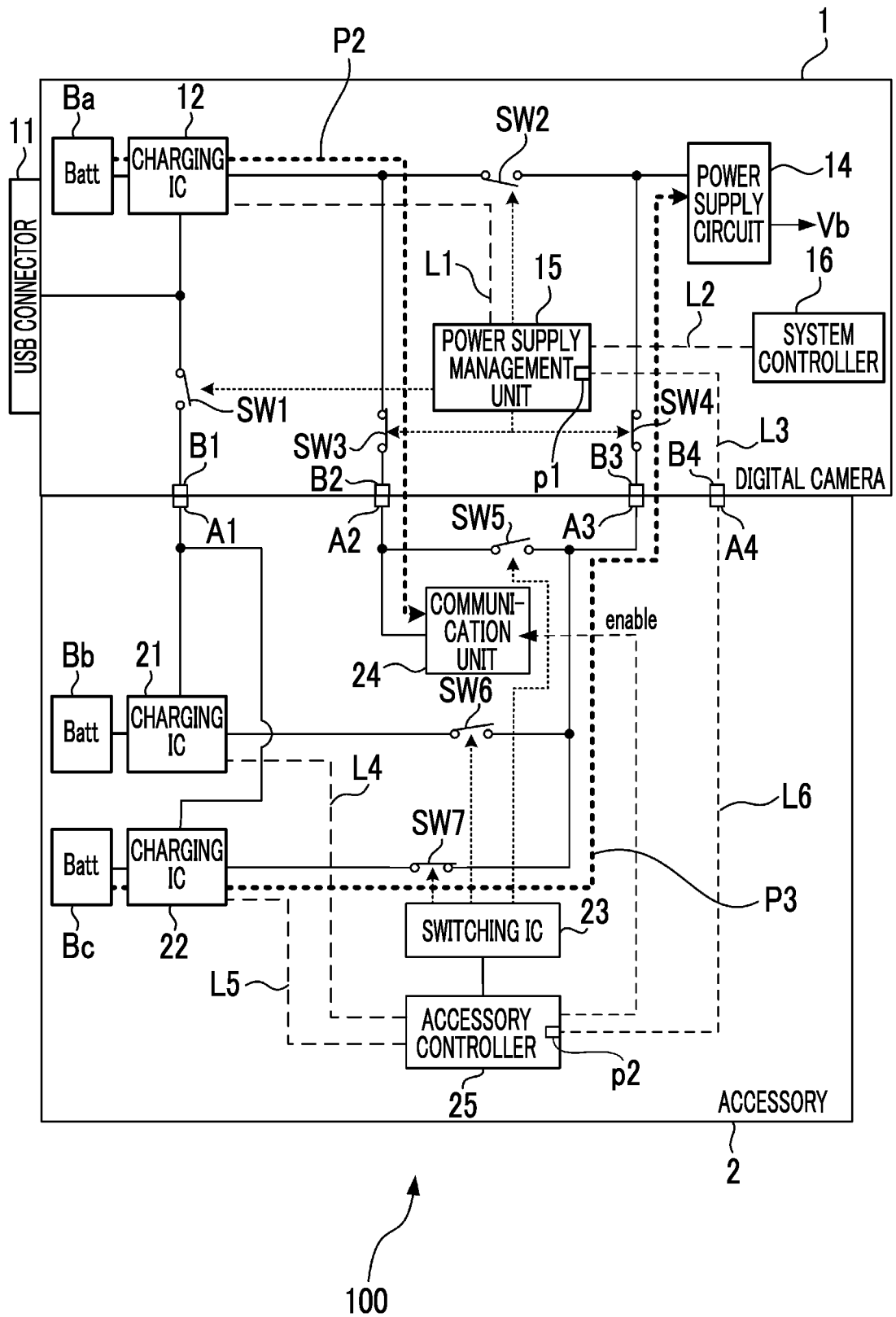
FIG. 2 is a diagram showing a state in which an accessory 2 is connected to a digital camera 1 shown in FIG. 1.

FIG. 1 is a schematic diagram showing a schematic configuration of a camera system 100 which is one embodiment of a system of an embodiment of the present invention. The camera system 100 comprises a digital camera 1 that constitutes an electronic device, and an accessory 2 as a connection device, which is connectable to the digital camera 1. FIG. 2 is a diagram showing a state in which the accessory 2 is connected to the digital camera 1 shown in FIG. 1.

The digital camera 1 is an imaging device including, for example, an imaging element (not shown), and an image processing circuit that processes an output signal of the imaging element to generate image data. The accessory 2 is a so-called external grip having a battery Bb and a battery Bc formed of a chargeable secondary battery, such as a lithium ion battery.

The digital camera 1 comprises, for example, a USB connector 11 corresponding to a Universal Serial Bus Power Delivery (USBPD) standard. The USB connector 11 is connected to an external power feed device, such as an outlet, a personal computer, a tablet type terminal, a smartphone, or a mobile battery, via a USB cable (not shown). Another connector corresponding to another standard may be used instead of the USB connector 11. Alternatively, an interface that receives power wirelessly from the external power feed device may be used instead of the USB connector 11. Each of the USB connector 11, another connector, and the interface constitutes a power receiving unit capable of receiving power from the external power feed device. Hereinafter, the power with which the power receiving unit is supplied from the external power feed device is also referred to as external power.

The digital camera 1 further comprises a battery Ba formed of a chargeable secondary battery, such as a lithium ion battery, a power supply circuit 14, a charging integrated circuit (IC) 12, a power supply management unit 15, and a system controller 16, switches SW1 to SW4 of which opening/closing is controlled by the power supply management unit 15, and terminals B1 to B4 that are used to perform electrical connection with the accessory 2. The switches SW1 to SW4 are each formed of a switching element, such as a transistor.

The charging IC 12 comprises an input terminal connected to the USB connector 11, a charging terminal connected to the battery Ba, and an output terminal, as terminals (not shown). The charging IC 12 has a power feed function in addition to a charging function of supplying power to the battery Ba from the charging terminal, on the basis of a voltage input to the input terminal. That is, the charging IC 12 is configured to output, from the output terminal, at least one of power input to the charging terminal from the battery Ba or power input to the input terminal from the external power feed device.

One end of the switch SW1 is connected to a node that connects the input terminal of the charging IC 12 to the USB connector 11. The other end of the switch SW1 is connected to the terminal B1. One end of the switch SW2 is connected to the output terminal of the charging IC 12. The other end of the switch SW2 is connected to a power supply terminal of the power supply circuit 14. One end of the switch SW3 is connected to a node that connects the output terminal of the charging IC 12 to the switch SW2. The other end of the switch SW3 is connected to the terminal B2. One end of the switch SW4 is connected to a node that connects the switch SW2 to the power supply circuit 14. The other end of the switch SW4 is connected to the terminal B3.

The power supply circuit 14 generates a power supply voltage Vb for operating various types of hardware, such as the power supply management unit 15, the system controller 16, the imaging element, and the image processing circuit, on the basis of the power supplied to the power supply terminal, and supplies the power supply voltage Vb to the various types of hardware. The power supply circuit 14 is configured to generate the power supply voltage Vb from each of the power supplied from the battery Ba, the external power, the power supplied from the battery Bb of the accessory 2, which will be described later, and the power supplied from the battery Bc of the accessory 2, which will be described later. The power supply voltage Vb or the voltage obtained by adjusting the power supply voltage Vb is supplied to an accessory controller 25 and the switching IC 23, which will be described later, as the operating voltage thereof by way of wiring lines connecting the digital camera 1 to the accessory 2 (not shown). Therefore, the accessory controller 25 and the switching IC 23 of the accessory 2 can be operated by the power supplied from the battery Ba even in a case where the remaining amounts of the battery Bb and the battery Bc are each less than a threshold value.

The power supply management unit 15 performs power supply management including the control to charge/discharge the battery Ba via the control of the charging IC 12 and the control to charge/discharge the battery Bb and the battery Bc via the control of the accessory controller 25, which will be described later. The power supply management unit 15 is formed of various processors, which will be described later.

The power supply management unit 15 is configured to communicate with the charging IC 12 via the communication line L1. The power supply management unit 15 is configured to communicate with the system controller 16 via a communication line L2. The power supply management unit 15 is configured to acquire information regarding the power supply capacity of the battery Ba (for example, a state of charge (SOC) indicating the remaining amount of the battery Ba or the maximum power that can be output) from the charging IC 12 via the communication line L1. The power supply management unit 15 is configured to acquire information regarding the power supply capacity of the external power feed device (for example, the maximum power that can be output by the external power feed device) via the communication line L1 and the charging IC 12. The power supply management unit 15 may acquire the information via a dedicated IC that acquires each of the power supply capacity of the battery Ba and the power supply capacity of the external power feed device.

The power supply management unit 15 is provided with a terminal p1 that is used to communicate with the accessory controller 25, which will be described later. The terminal p1 is connected to the terminal B4 via a communication line L3. The power supply management unit 15 performs control to close the switch SW2 and open the switch SW1, the switch SW3, and the switch SW4 as shown in FIG. 1, in a state in which the accessory 2 is not connected to the digital camera 1. With this control, a power supply path P1 from the battery Ba to the power supply circuit 14 by way of the charging IC 12 and the switch SW2 is formed.

The system controller 16 is formed of various processors, which will be described later. The system controller 16 controls the entire digital camera 1 in an integrated manner, and specifically, is formed of a processor having a higher processing capacity than that of the power supply management unit 15.

The accessory 2 comprises the battery Bb, a charging IC 21 that charges the battery Bb, the battery Bc, a charging IC 22 that charges the battery Bc, switches SW5 to SW7, the switching IC 23 that performs control to open/close each of the switches SW5 to SW7, a communication unit 24, the accessory controller 25, and terminals A1 to A4 that are used to perform electrical connection with the digital camera 1. The switches SW5 to SW7 are each formed of a switching element, such as a transistor. The battery Bb and the battery Bc are attachable and detachable with respect to a housing constituting the exterior of the accessory 2.

As shown in FIG. 2, the terminal A1 and the terminal B1 are electrically connected to each other, the terminal A2 and the terminal B2 are electrically connected to each other, the terminal A3 and the terminal B3 are electrically connected to each other, and the terminal A4 and the terminal B4 are electrically connected to each other, in a state in which the accessory 2 is connected to the digital camera 1. One end of the switch SW5 is connected to the terminal A2. The other end of the switch SW5 is connected to the terminal A3. The communication unit 24 is also connected to the terminal A2.

The charging IC 21 comprises an input terminal connected to the terminal A1, a charging terminal connected to the battery Bb, and an output terminal, as terminals (not shown). The charging IC 21 has a power feed function in addition to a charging function of supplying power to the battery Bb from the charging terminal, on the basis of a voltage input to the input terminal. That is, the charging IC 21 is configured to output, from the output terminal, power input to the charging terminal from the battery Bb and power input to the input terminal from the external power feed device. One end of the switch SW6 is connected to the output terminal of the charging IC 21. The other end of the switch SW6 is connected to a node that connects the switch SW5 to the terminal A3.

The charging IC 22 comprises an input terminal connected to the terminal A1, a charging terminal connected to the battery Bc, and an output terminal, as terminals (not shown). The charging IC 22 has a power feed function in addition to a charging function of supplying power to the battery Bc from the charging terminal, on the basis of a voltage input to the input terminal. That is, the charging IC 22 is configured to output, from the output terminal, power input to the charging terminal from the battery Bc and power input to the input terminal from the external power feed device. One end of the switch SW7 is connected to the output terminal of the charging IC 22. The other end of the switch SW7 is connected to the node that connects the switch SW5 to the terminal A3.

The switching IC 23 can supply power to the power supply circuit 14 from any one of the battery Ba, the battery Bb, or the battery Bc by closing only one of the switches SW5 to SW7 in accordance with the control performed by the accessory controller 25.

The accessory controller 25 performs control to charge/discharge the battery Bb and the battery Bc by controlling the charging IC 21 and the charging IC 22, respectively. The accessory controller 25 is formed of various processors, which will be described later. The accessory controller 25 is configured to communicate with the charging IC 21 via a communication line L4. The accessory controller 25 is configured to communicate with the charging IC 22 via a communication line L5. The accessory controller 25 is configured to acquire information regarding the power supply capacity of the battery Bb (for example, the SOC indicating the remaining amount of the battery Bb or the maximum power that can be output by the battery Bb) from the charging IC 21 via the communication line L4. The accessory controller 25 is configured to acquire information regarding the power supply capacity of the battery Bc (for example, the SOC indicating the remaining amount of the battery Bc or the maximum power that can be output by the battery Bc) from the charging IC 22 via the communication line L5.

The accessory controller 25 is provided with a terminal p2 that is used to communicate with the power supply management unit 15 of the digital camera 1. The terminal p2 is connected to the terminal A4 via a communication line L6. As shown in FIG. 2, the terminal p2 of the accessory controller 25 and the terminal p1 of the power supply management unit 15 are connected to each other via the communication line L6, the terminal A4, the terminal B4, and the communication line L3, in a state in which the accessory 2 is attached to the digital camera 1. The accessory controller 25 transmits information regarding the power supply capacities acquired from the charging IC 21 and the charging IC 22 from the terminal p2 to the power supply management unit 15. Further, the accessory controller 25 controls the switching IC 23 to control the open/closed states of the switch SW5, the switch SW6, and the switch SW7, controls the charging IC 21 and the charging IC 22 to charge/discharge the battery Bb and the battery Bc, respectively, or performs the power supply control for the communication unit 24, on the basis of command information transmitted from the power supply management unit 15 and received via the terminal p2.

The communication unit 24 includes a communication interface that is used to communicate with an external device other than the digital camera 1 and a power supply circuit that generates a power supply voltage necessary for the operation of the communication interface. The communication interface is used for the direct or indirect connection with the external device, via Universal Serial Bus (USB), IEEE 1394, Bluetooth (registered trademark), radio frequency identification (RFID), infrared communication (Infrared Data Association: IrDA) (registered trademark), Ultra Wideband (UWB) (registered trademark), ZigBee (registered trademark), or the like, or a network (for example, Ethernet (registered trademark) or wireless local area network (LAN)). Examples of the external device include a smartphone, a personal computer, and a display.

Specifically, the communication interface provided in the communication unit 24 is formed of an integrated circuit (IC). An input terminal of the power supply circuit provided in the communication unit 24 is connected to the terminal A2. In a case where an enable signal is input to an enable terminal (not shown) from the accessory controller 25, the power supply circuit generates a power supply voltage on the basis of the power input to the input terminal, and supplies the power supply voltage to the communication interface of the communication unit 24, as an operating voltage. The power supply circuit stops generating the power supply voltage on the basis of the power input to the input terminal in a case where a disable signal is input to the enable terminal from the accessory controller 25. That is, in a case where the disable signal is transmitted from the accessory controller 25 to the power supply circuit of the communication unit 24, the power supply to the communication interface of the communication unit 24 is stopped. The communication interface of the communication unit 24 is configured to communicate with the system controller 16 of the digital camera 1 via a communication line (not shown), and is controlled by the system controller 16. The communication interface of the communication unit 24 may be configured to communicate with the system controller 16 of the digital camera 1 via the accessory controller 25 and the power supply management unit 15.

The above-mentioned various processors include, for example, a central processing unit (CPU) which is a general-purpose processor that executes software (programs) to function as various processing units, a programmable logic device (PLD), such as a field programmable gate array (FPGA), which is a processor having a changeable circuit configuration after manufacture, a dedicated electric circuit, such as an application specific integrated circuit (ASIC), which is a processor having a dedicated circuit configuration designed to execute specific processing.

The power supply management unit 15, the system controller 16, and the accessory controller 25 may be each formed of one of the various processors, or a combination of two or more processors of the same type or different types (For example, a plurality of FPGAs or a combination of a CPU and an FPGA). More specifically, the hardware structure of these various processors is an electric circuit (circuitry) in which circuit elements, such as semiconductor elements, are combined.

Operation of Camera System 100: Case A

Hereinafter, the operation of the camera system 100 will be described on the premise that the battery Ba is sufficiently charged. FIG. 2 is a diagram illustrating the operation of the camera system 100 in a case where the accessory 2 is connected to the digital camera 1 and the external power feed device is not connected to the USB connector 11.

As shown in FIG. 2, in a case where the accessory 2 is connected to the digital camera 1, the power supply management unit 15 communicates with the accessory controller 25 to acquire information regarding the power supply capacity of the battery Bb and information regarding the power supply capacity of the battery Bc. In a case where the power supply capacity of at least one of the battery Bb or the battery Bc exceeds a first threshold value, the power supply management unit 15 controls the accessory controller 25 to close only the switch SW6 or the switch SW7 out of the switches SW5 to SW7, and controls the accessory controller 25 to transmit the enable signal to the power supply circuit of the communication unit 24.

Specifically, in a case where only the power supply capacity of the battery Bb, out of the battery Bb and the battery Bc, exceeds the first threshold value, the power supply management unit 15 controls only the switch SW6, out of the switches SW5 to SW7, to be in a closed state. In a case where only the power supply capacity of the battery Bc, out of the battery Bb and the battery Bc, exceeds the first threshold value, the power supply management unit 15 controls only the switch SW7, out of the switches SW5 to SW7, to be in a closed state. In a case where the power supply capacities of both the battery Bb and the battery Bc each exceed the first threshold value, the power supply management unit 15 performs control to open/close the switches SW5 to SW7 in accordance with predetermined priority. Here, it is assumed that the battery Bc has the highest priority, the battery Bb has the next highest priority, and the battery Ba has the lowest priority, as priority related to the use of the battery. In a case where the power supply capacities of both the battery Bb and the battery Bc each exceed the first threshold value, the power supply management unit 15 controls only the switch SW7, out of the switches SW5 to SW7, to be in a closed state. FIG. 2 shows an operation state in a case where the power supply capacity of each of the battery Bb and the battery Bc exceeds the first threshold value.

Further, the power supply management unit 15 performs control to open the switch SW1 and the switch SW2 and close the switch SW3 and the switch SW4. With the above control, as shown in FIG. 2, a power supply path P2 from the battery Ba to the communication interface of the communication unit 24 by way of the charging IC 12, the switch SW3, the terminal B2, the terminal A2, and the power supply circuit of the communication unit 24 is formed. Further, as shown in FIG. 2, a power supply path P3 from the battery Bc to the charging IC 22, the switch SW7, the terminal A3, the terminal B3, the switch SW4, and the power supply circuit 14 is formed.

In a case where the power supply capacity of the battery Bc is the first threshold value or less and the power supply capacity of the battery Bb exceeds the first threshold value, a power supply path from the battery Bb to the charging IC 21, the switch SW6, the terminal A3, the terminal B3, the switch SW4, and the power supply circuit 14 is formed instead of the power supply path P3. The state in which the power supply capacity of the battery Bb or the battery Bc is the first threshold value or less includes a state in which the battery Bb or the battery Bc is removed from the accessory 2.

Operation of Camera System 100: Case B

Figure 3:
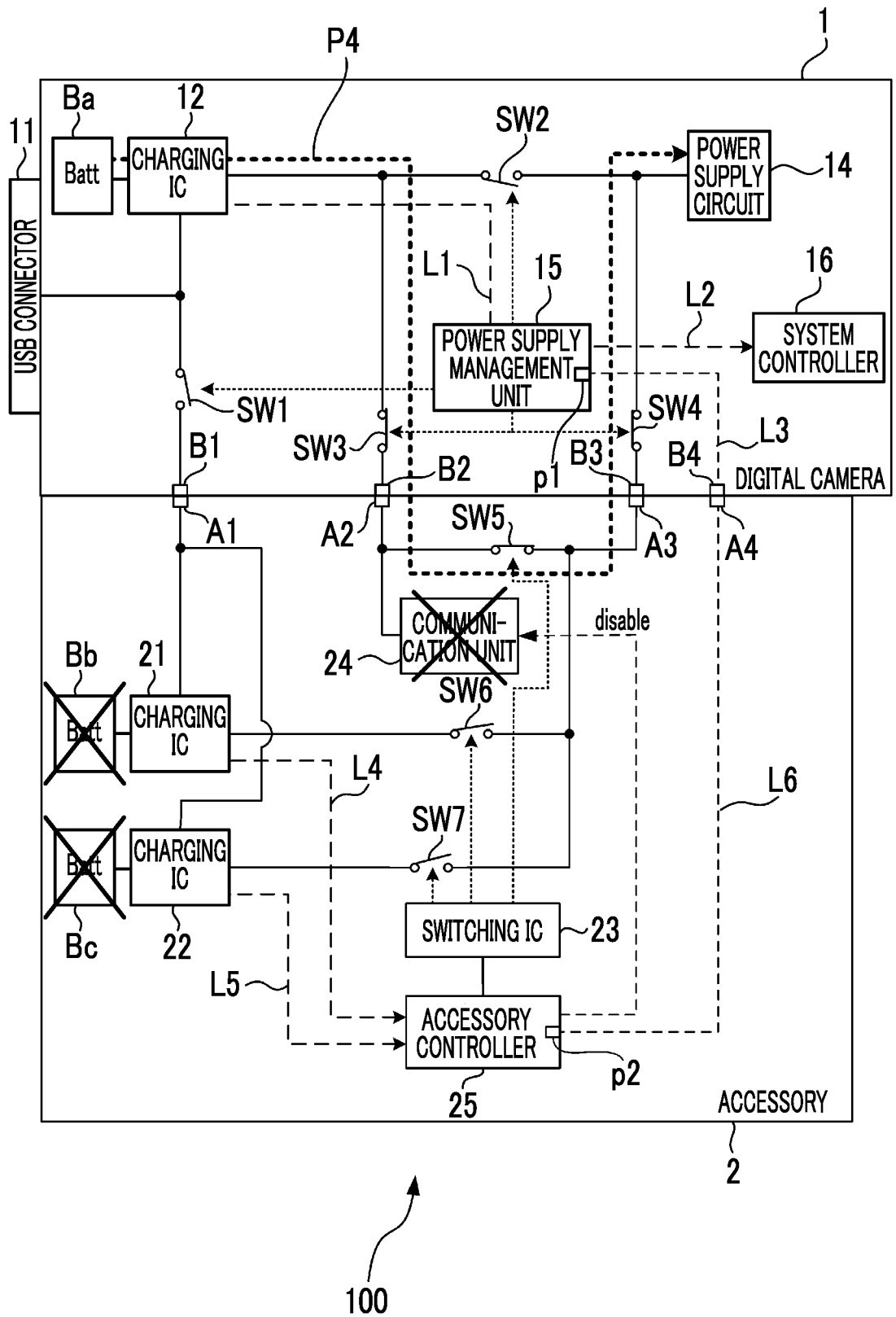
FIG. 3 is a diagram illustrating an operation of the camera system 100 in a case where a power supply capacity of each of a battery Bb and a battery Bc is a threshold value or less in a state of FIG. 2.

FIG. 3 is a diagram illustrating the operation of the camera system 100 in a case where the power supply capacity of each of the battery Bb and the battery Bc is the first threshold value or less in the state of FIG. 2.

In a case where the power supply capacity of each of the battery Bb and the battery Bc is the first threshold value or less, the system controller 16 stops controlling the communication interface of the communication unit 24. Further, the power supply management unit 15 controls the accessory controller 25 to close only the switch SW5, out of the switches SW5 to SW7, and to transmit the disable signal to the power supply circuit of the communication unit 24. With this control, as shown in FIG. 3, a power supply path P4 from the battery Ba to the power supply circuit 14 by way of the charging IC 12, the switch SW3, the terminal B2, the terminal A2, the switch SW5, the terminal A3, the terminal B3, and the switch SW4 is formed.

As described above, in the camera system 100, in a case where the power supply capacity of the battery Bb or the battery Bc exceeds the first threshold value, power is supplied from the battery Bb or the battery Bc to the power supply circuit 14, and power is supplied from the battery Ba provided in the digital camera 1 to the communication unit 24 provided in the accessory 2. That is, power can be supplied to the communication unit 24 only from the battery Ba, out of the battery Ba, the battery Bb, and the battery Bc. In other words, power cannot be supplied from the battery Bb or the battery Bc of the accessory 2 to the communication unit 24. According to this configuration, it is possible to prevent each battery from having high-level functionality and to reduce the size, weight, or cost of the camera system 100 by distributing and feeding power between the battery Ba, and the battery Bb or the battery Bc, even in a case where the total value of power to be supplied to the power supply circuit 14 and power to be supplied to the communication unit 24 is large and it is not possible to supply the power corresponding to this total value with only one battery.

Here, a configuration in which power can be supplied from the battery Bb or the battery Bc to both the communication unit 24 and the power supply circuit 14 is assumed as a reference configuration. In this reference configuration, in a case where the total value is large, it is difficult to reduce the size, weight, or cost of the battery Bb or the battery Bc. On the other hand, with the camera system 100, since the battery Bb or the battery Bc need only be able to output the power to be supplied to the power supply circuit 14, it is possible to reduce the size, weight, or cost. Further, in the reference configuration, in a case where the power supply capacity of the battery Bb or the battery Bc is in a state in which power supplied to the power supply circuit 14 can be secured and power supplied to the communication unit 24 cannot be secured, the communication unit 24 cannot be continuously operated. On the other hand, with the camera system 100, the communication unit 24 can be continuously operated as long as the power supply capacity of the battery Bb or the battery Bc is in a state in which the power to be supplied to the power supply circuit 14 can be secured. As described above, with the camera system 100, the function of the communication unit 24 can be maintained for a long time, and the convenience of the digital camera 1 can be improved.

Further, in the camera system 100, in a case where the power supply capacities of the battery Bb and the battery Bc are each the first threshold value or less, the power supply to the communication unit 24 is stopped, and power is supplied from the battery Ba to the power supply circuit 14. It is possible to continuously operate the digital camera 1 by stopping supplying power to the communication unit 24 and by supplying power to the power supply circuit 14, even in a case where the total value of power to be supplied to the power supply circuit 14 and power to be supplied to the communication unit 24 is large and it is not possible to supply the power corresponding to this total value with the battery Ba alone.

Further, in the camera system 100, in a case where the power supply capacities of the battery Bb and the battery Bc are each the first threshold value or less, the power supply path P2 shown in FIG. 2 is changed to the power supply path P4 shown in FIG. 3. A configuration is conceivable in which the power supply path P2 shown in FIG. 2 is switched to the power supply path P1 shown in FIG. 1, for example, in a case where the power supply capacities of the battery Bb and the battery Bc are each the first threshold value or less. In this configuration, it is necessary to control both the switch provided in the digital camera 1 and the switch provided in the accessory 2, for the switching of the power supply path. On the other hand, with the camera system 100, it is possible to perform switching from the power supply path P2 to the power supply path P4 only by controlling the switch provided in the accessory 2. Therefore, the control necessary for switching the power supply path can be simplified, and high-speed and stable switching is possible.

Next, the operation of the camera system 100 in a case where the external power feed device 200 is connected to the USB connector 11 in a state in which the accessory 2 is connected to the digital camera 1 will be described.

Operation of Camera System 100: Case C

Figure 4:
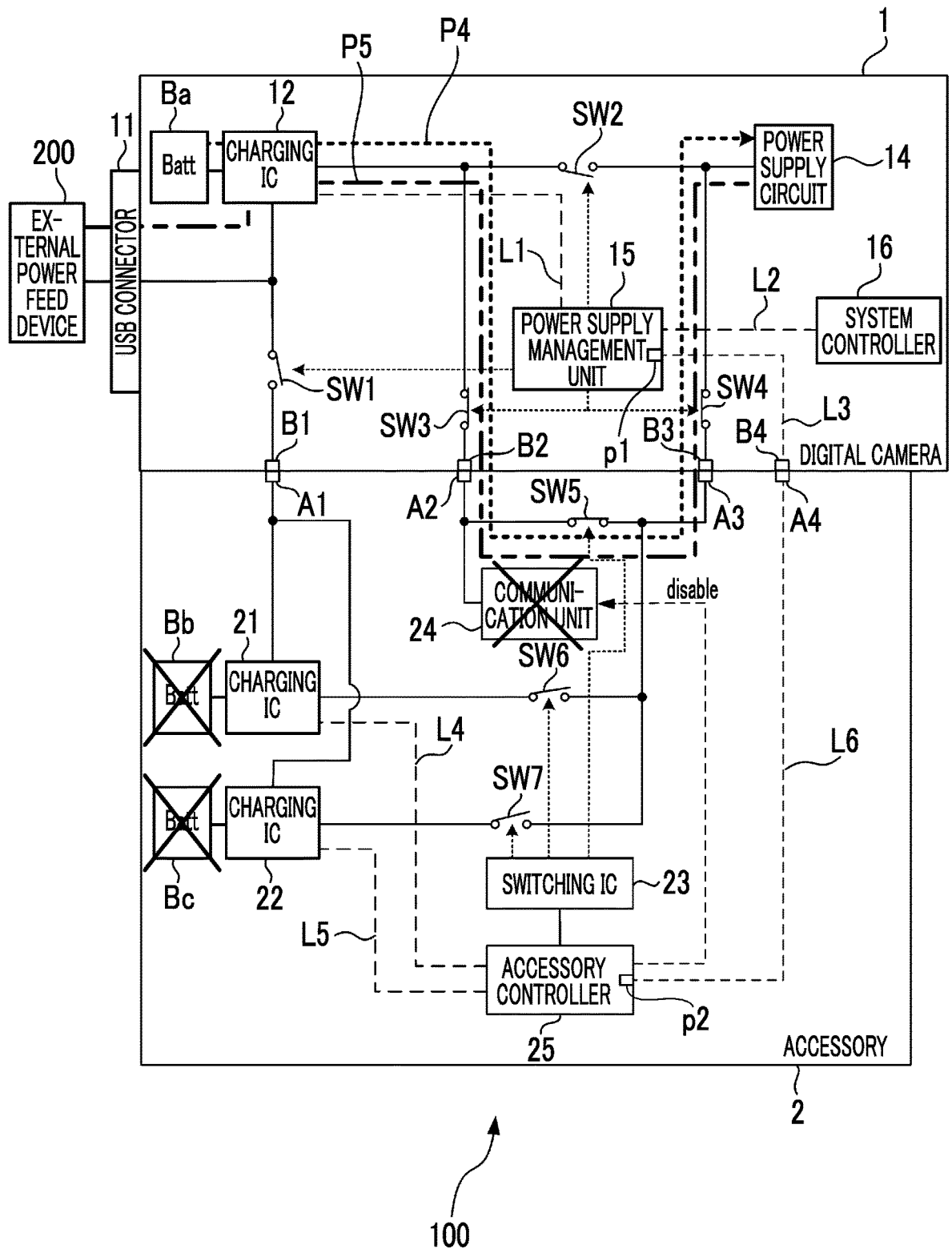
FIG. 4 is a diagram illustrating an operation of the camera system 100 in a case where an external power feed device 200 is connected to a USB connector 11 in a state of FIG. 3.

FIG. 4 is a diagram illustrating the operation of the camera system 100 in a case where the external power feed device 200 is connected to the USB connector 11 in the state of FIG. 3. In a case where the external power feed device 200 is connected to the USB connector 11 in a state in which the operation of the communication unit 24 is stopped, the power supply management unit 15 maintains the open/closed states of the switches SW1 to SW7 in the state shown in FIG. 3. In addition, the power supply management unit 15 controls the charging IC 12 such that the external power supplied from the external power feed device 200 to the input terminal of the charging IC 12 is output from the output terminal of the charging IC 12. With this control, a power supply path P5 from the external power feed device 200 to the power supply circuit 14 by way of the USB connector 11, the charging IC 12, the switch SW3, the terminal B2, the terminal A2, the switch SW5, the terminal A3, the terminal B3, and the switch SW4 is formed in addition to the already formed power supply path P4. With the operation shown in FIG. 4, it is possible to reduce the power consumption of the battery Ba by forming the power supply path P5 in addition to the power supply path P4.

Operation of Camera System 100: Case D

Figure 5:
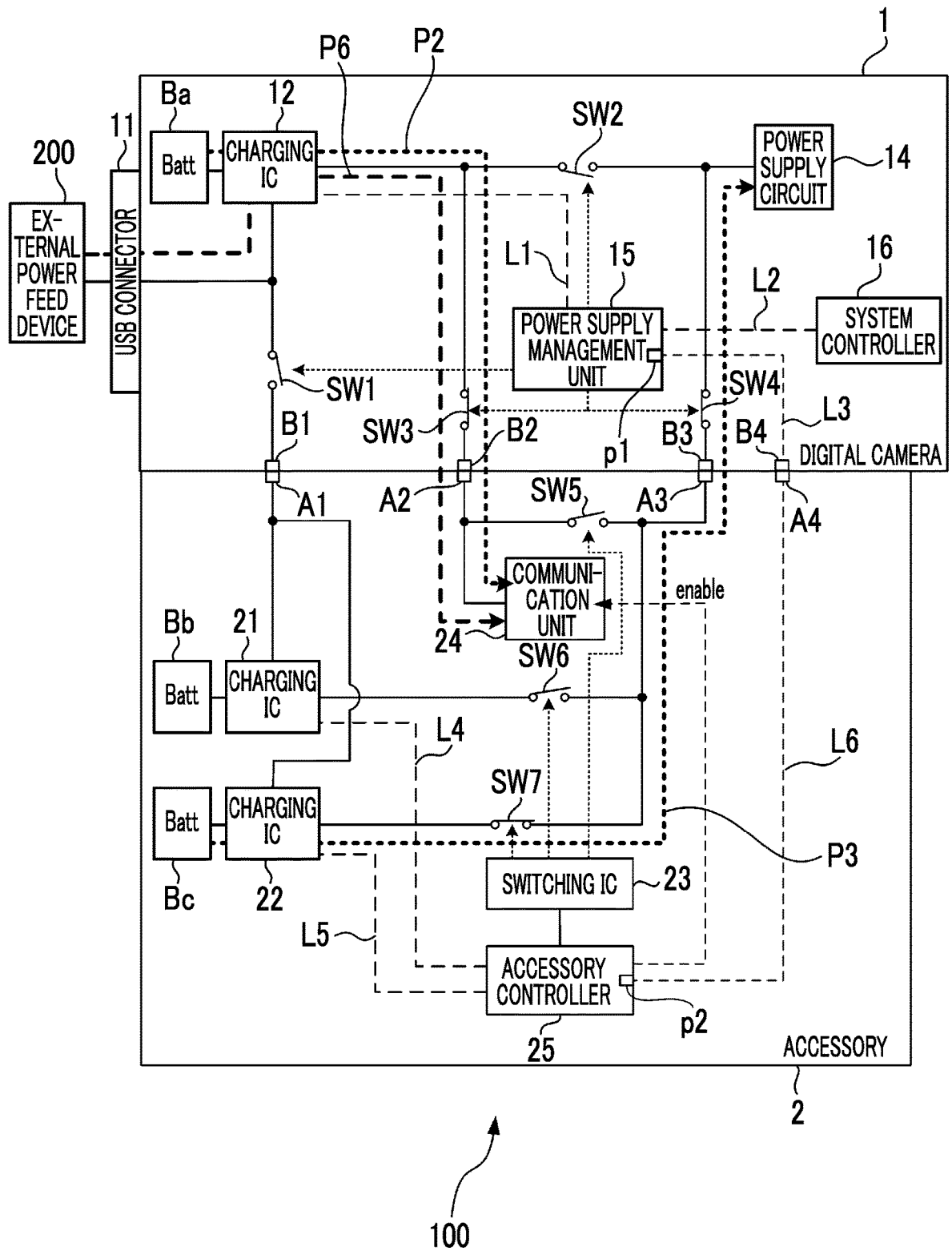
FIG. 5 is a diagram illustrating an operation of the camera system 100 in a case where the external power feed device 200 is connected to the USB connector 11 in a state of FIG. 2.
Figure 6:
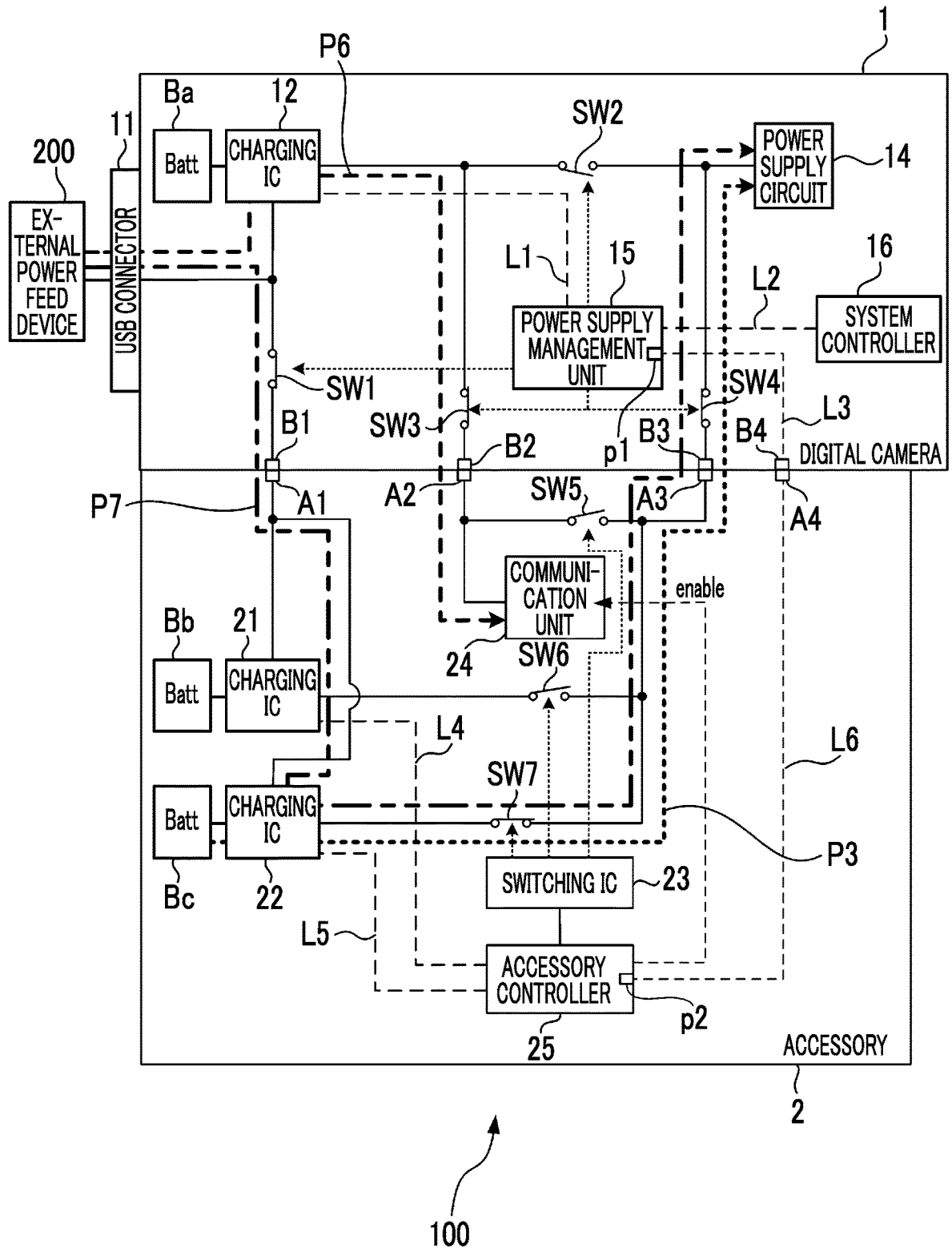
FIG. 6 is a diagram illustrating an operation of the camera system 100 in a case where the external power feed device 200 is connected to the USB connector 11 in the state of FIG. 2.

FIGS. 5 and 6 are each a diagram illustrating the operation of the camera system 100 in a case where the external power feed device 200 is connected to the USB connector 11 in the state of FIG. 2. FIG. 5 shows an operation in a case where the power supply capacity of the external power feed device 200 is less than the minimum value necessary for the operation of the communication unit 24 (hereinafter, referred to as a second threshold value). FIG. 6 shows an operation in a case where the power supply capacity of the external power feed device 200 is the second threshold value or more.

In a case where the external power feed device 200 is connected to the USB connector 11 in a state in which the operation of the communication unit 24 is not stopped, the power supply management unit 15 acquires the power supply capacity of the external power feed device 200. In a case where the power supply capacity of the external power feed device 200 is less than the second threshold value, the power supply management unit 15 maintains the open/closed states of the switches SW1 to SW7 in the state shown in FIG. 2. Further, the power supply management unit 15 controls the charging IC 12 such that the external power supplied from the external power feed device 200 to the input terminal of the charging IC 12 is output from the output terminal of the charging IC 12. With this control, a power supply path P6 from the external power feed device 200 to the communication interface of the communication unit 24 by way of the USB connector 11, the charging IC 12, the switch SW3, the terminal B2, the terminal A2, and the power supply circuit of the communication unit 24 is formed in addition to the already formed power supply path P2 and power supply path P3. With the operation shown in FIG. 5, it is possible to reduce the power consumption of the battery Ba while maintaining the function of the communication unit 24 by forming the power supply path P6.

In a case where the acquired power supply capacity of the external power feed device 200 is the second threshold value or more, the power supply management unit 15 controls the open/closed states of the switches SW1 to SW7 to a state in which the switch SW1 is closed, with respect to the state shown in FIG. 2. In addition, the power supply management unit 15 controls the charging IC 12 such that the power supplied from the battery Ba is not output from the output terminal of the charging IC 12. Further, the power supply management unit 15 controls the charging IC 12 such that power corresponding to the second threshold value, out of the external power supplied from the external power feed device 200 to the input terminal of the charging IC 12, is output from the output terminal of the charging IC 12. Further, the power supply management unit 15 controls the charging IC 22 such that the external power (the remaining power excluding the second threshold value) supplied to the input terminal of the charging IC 22 is output from the output terminal of the charging IC 22.

With this control, the power supply path P6 from the external power feed device 200 to the communication interface of the communication unit 24 by way of the USB connector 11, the charging IC 12, the switch SW3, the terminal B2, the terminal A2, and the power supply circuit of the communication unit 24 is formed instead of the power supply path P2. In addition, a power supply path P7 from the external power feed device 200 to the power supply circuit 14 by way of the USB connector 11, the switch SW1, the terminal B1, the terminal A1, the charging IC 22, the switch SW7, the terminal A3, the terminal B3, and the switch SW4 is formed in addition to the already formed power supply path P3. With the operation shown in FIG. 6, it is possible to reduce the power consumption of the battery Ba while maintaining the function of the communication unit 24 by forming the power supply path P6. Further, it is possible to reduce the power consumption of the battery Bc by forming the power supply path P7.

Example of External Appearance of Camera System 100

Figure 7:
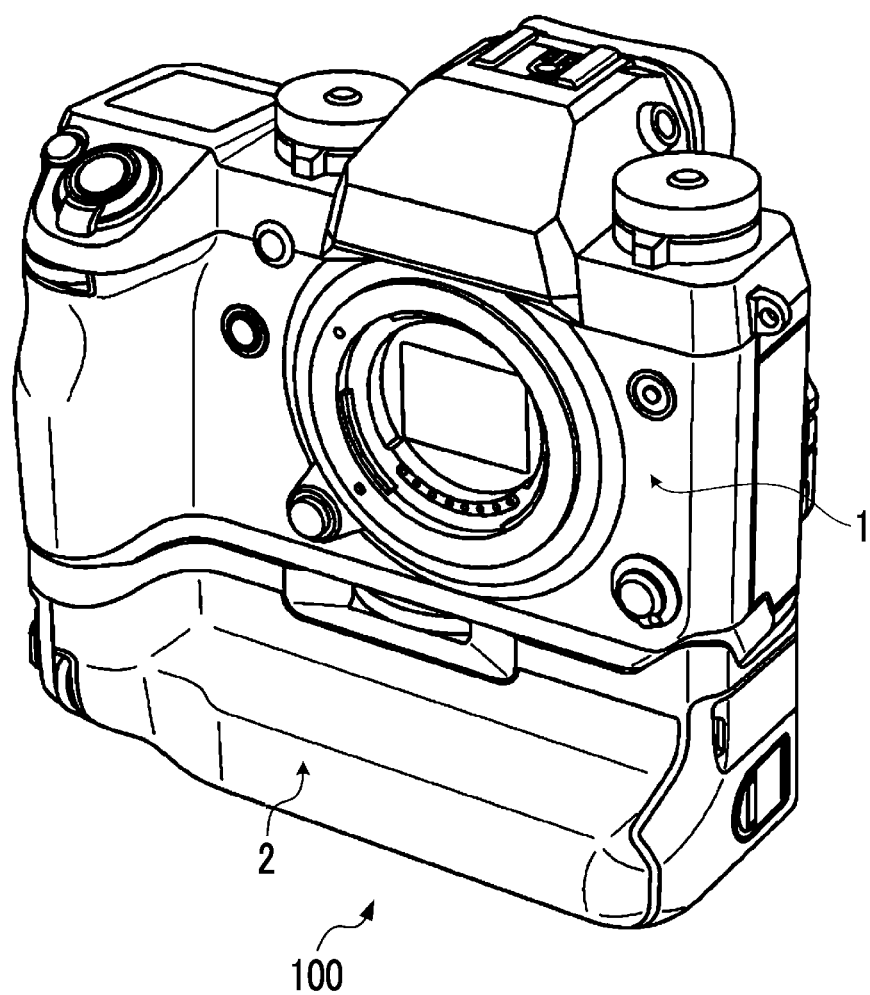
FIG. 7 is a diagram showing an example of external appearance of the camera system 100 shown in FIG. 1.
Figure 8:
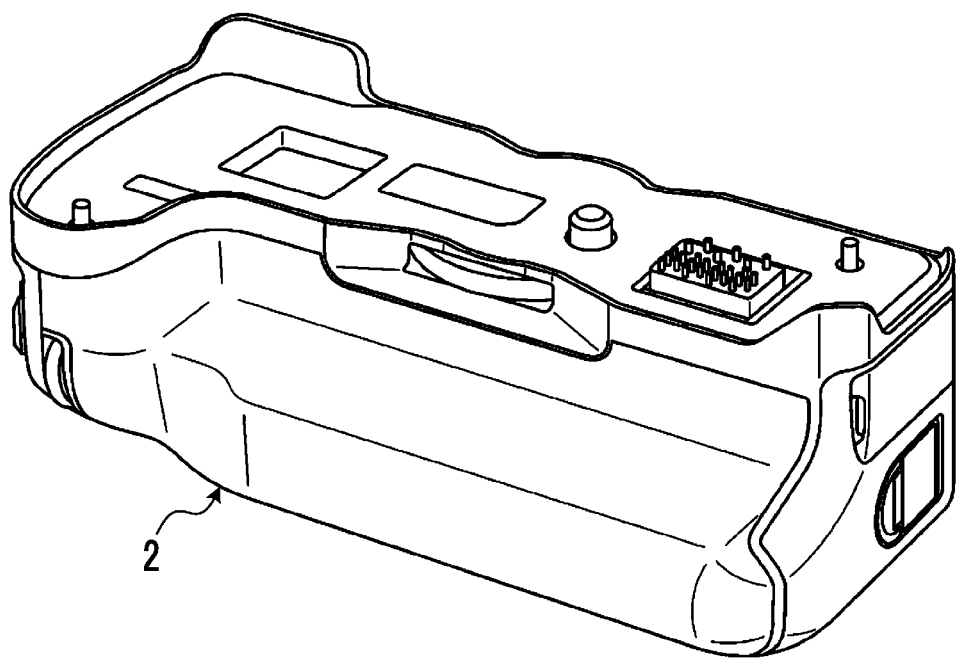
FIG. 8 is a perspective view of the accessory 2 of the camera system 100 shown in FIG. 7 as viewed from a front surface side.

FIG. 7 is a diagram showing an example of the external appearance of the camera system 100 shown in FIG. 1, and is a perspective view of the camera system 100 in a state in which the accessory 2 is connected to the digital camera 1 as viewed from the front surface side. FIG. 8 is a perspective view of the accessory 2 of the camera system 100 shown in FIG. 7 as viewed from the front surface side. Although the accessory 2 is connectable to the bottom surface portion of the digital camera 1, the accessory 2 may be connectable to the side surface portion of the digital camera 1.

Various Modification Examples

In the above camera system 100, the configuration is adopted in which the accessory 2 has two batteries, but the number of batteries provided in the accessory 2 is not limited thereto and may be one, or three or more.

In the above description, the digital camera is shown as an example of the electronic device, and the external grip is shown as an example of the connection device, but the present invention is not limited thereto. For example, the digital camera 1 may be replaced with a personal computer, and the accessory 2 may be replaced with an external battery. The digital camera 1 may be replaced with a smartphone, and the accessory 2 may be replaced with an external TV tuner with a battery.

The communication unit 24 provided in the accessory 2 includes the communication interface that is used to communicate with the external device, but the present invention is not limited thereto. For example, an interface that is used to record information on a recording medium may be used, or an interface that is used to give notice to a user may be used, instead of the communication interface. These interfaces are each formed of an integrated circuit. In a case where the interface that is used to record information on a recording medium is used, the information recording function realized by the accessory 2 can be maintained for a long time. In a case where the interface that is used to give notice is used, the notice function realized by the accessory 2 can be maintained for a long time.

In the camera system 100, the power supply management unit 15 plays a central role in controlling the charging IC 12, controlling the charging IC 21, controlling the charging IC 22, controlling the opening/closing of the switches SW1 to SW7, and controlling the power supply of the communication unit 24. However, a configuration may be adopted in which the accessory controller 25 plays a central role in controlling the charging IC 12, controlling the charging IC 21, controlling the charging IC 22, controlling the opening/closing of the switches SW1 to SW7, and controlling the power supply of the communication unit 24. In this case, the accessory controller 25 need only control the charging IC 12 and perform control to open/close the switches SW1 to SW4 by transmitting command information to the power supply management unit 15.

As described above, at least the following matters are described in the present specification. It should be noted that the constituent elements and the like corresponding to the above-described embodiment are shown in parentheses, but the present invention is not limited thereto.

(1)
An electronic device (digital camera 1) to which a connection device (accessory 2) having a second battery (batteries Bb and Bc) and a first circuit (communication interface of the communication unit 24) is connectable, the electronic device comprising:
a first battery (battery Ba);
a power supply circuit (power supply circuit 14); and
a processor (power supply management unit 15),
in which the processor
performs control to supply power to the first circuit from the first battery and to supply power to the power supply circuit from the second battery, in a state in which the connection device is connected, and performs control to supply power to the power supply circuit from the first battery in a state in which the connection device is not connected.

(2)
The electronic device according to (1),
in which the first circuit is a circuit that is used to communicate with an external device.

(3)
The electronic device according to (1) or (2),
in which the processor performs control to supply power to the power supply circuit from the first battery, in a state in which the connection device is connected and a power supply capacity of the second battery is a first threshold value or less.

(4)
The electronic device according to (3),
in which the processor performs control to stop supplying power to the first circuit from the first battery and to supply power to the power supply circuit from the first battery, in a state in which the connection device is connected and the power supply capacity of the second battery is the first threshold value or less.

(5)
The electronic device according to (3) or (4),
in which the processor performs control to supply power supplied from the first battery to the power supply circuit via a power supply path provided inside the connection device, in a state in which the connection device is connected and the power supply capacity of the second battery is the first threshold value or less.

(6)
The electronic device according to any one of (1) to (5), further comprising:
a power receiving unit (USB connector 11) capable of receiving power from an external power feed device (external power feed device 200),
in which the processor performs control to supply power to the first circuit from the external power feed device, in a state in which the connection device is connected and the power receiving unit is supplied with power from the external power feed device.

(7)
The electronic device according to (6),
in which the processor performs control to stop supplying power to the first circuit from the first battery and to supply power to the first circuit from the external power feed device, in a state in which the connection device is connected and the power receiving unit is supplied with power from the external power feed device.

(8)
The electronic device according to (7),
in which the processor performs control to distribute and supply power supplied from the external power feed device to the first circuit and the power supply circuit in a case where a power supply capacity of the external power feed device is a second threshold value or more.

(9)
The electronic device according to any one of (1) to (5), further comprising:
a power receiving unit (USB connector 11) capable of receiving power from an external power feed device (external power feed device 200),
in which the processor performs control to supply power to the power supply circuit from the external power feed device, in a state in which the connection device is connected and the power receiving unit is supplied with power from the external power feed device.

(10)
The electronic device according to any one of (1) to (9),
in which the electronic device is an imaging device, and the connection device is a grip.

(11)
An electronic device (digital camera 1) to which a connection device (accessory 2) having a second battery (batteries Bb and Bc) and a first circuit (communication interface of the communication unit 24) is connectable, the electronic device comprising:
a first battery (battery Ba);
a power supply circuit (power supply circuit 14); and
a processor (power supply management unit 15),
in which the processor performs control to supply power to the first circuit from only the first battery out of the first battery and the second battery in a state in which the connection device is connected.

(12)
A connection device (accessory 2) that is connectable to an electronic device (digital camera 1) having a first battery (battery Ba) and a power supply circuit (power supply circuit 14), the connection device comprising:
a second battery (batteries Bb and Bc); and
a first circuit (communication interface of the communication unit 24),
in which power is supplied to the first circuit from the first battery, and power is supplied to the power supply circuit from the second battery, in a state in which the connection device is connected to the electronic device.

(13)
A system (camera system 100) comprising:
an electronic device (digital camera 1) having a first battery (battery Ba) and a power supply circuit (power supply circuit 14);
a connection device (accessory 2) that has a second battery (batteries Bb and Bc) and a first circuit (communication interface of the communication unit 24) and is connectable to the electronic device; and
a processor (power supply management unit 15 or accessory controller 25),
in which the processor
performs control to supply power to the first circuit from the first battery and to supply power to the power supply circuit from the second battery, in a state in which the connection device is connected to the electronic device.

(14)
A power supply method comprising:
a step of performing control to supply power to a first circuit from a first battery and to supply power to a power supply circuit from a second battery, in a state in which a connection device having the second battery and the first circuit is connected to an electronic device having the first battery and the power supply circuit.

(15)
A power supply program causing a processor to execute:
a step of performing control to supply power to a first circuit from a first battery and to supply power to a power supply circuit from a second battery, in a state in which a connection device having the second battery and the first circuit is connected to an electronic device having the first battery and the power supply circuit.

EXPLANATION OF REFERENCES

1: digital camera
2: accessory

11: USB connector
12, 21, 22: charging IC
14: power supply circuit
15: power supply management unit
16: system controller
23: switching IC
24: communication unit
25: accessory controller
100: camera system
200: external power feed device
Ba, Bb, Bc: battery
SW1, SW2, SW3, SW4, SW5, SW6, SW7: switch
B1, B2, B3, B4: terminal
A1, A2, A3, A4: terminal
p1, p2: terminal
L1, L2, L3, L4, L5, L6: communication line
P1, P2, P3, P4, P5, P6, P7: power supply path

What is claimed is:

1. An electronic device to which a connection device having a second battery and a first circuit is connectable, the electronic device comprising:
   a first battery;
   a power supply circuit; and
   a processor,
   wherein the processor is configured to:
   perform control to supply power to the first circuit from the first battery and to supply power to the power supply circuit from the second battery, in a state in which the connection device is connected; and
   perform control to supply power to the power supply circuit from the first battery in a state in which the connection device is not connected.

2. The electronic device according to claim 1,
   wherein the first circuit is a circuit that is used to communicate with an external device.

3. The electronic device according to claim 2,
   wherein the processor is configured to perform control to supply power to the power supply circuit from the first battery, in a state in which the connection device is connected and a power supply capacity of the second battery is a first threshold value or less.

4. The electronic device according to claim 3,
   wherein the processor is configured to perform control to stop supplying power to the first circuit from the first battery and to supply power to the power supply circuit from the first battery, in a state in which the connection device is connected and the power supply capacity of the second battery is the first threshold value or less.

5. The electronic device according to claim 4,
   wherein the processor is configured to perform control to supply power supplied from the first battery to the power supply circuit via a power supply path provided inside the connection device, in a state in which the connection device is connected and the power supply capacity of the second battery is the first threshold value or less.

6. The electronic device according to claim 3,
   wherein the processor is configured to perform control to supply power supplied from the first battery to the power supply circuit via a power supply path provided inside the connection device, in a state in which the connection device is connected and the power supply capacity of the second battery is the first threshold value or less.

7. The electronic device according to claim 1,
   wherein the processor is configured to perform control to supply power to the power supply circuit from the first battery, in a state in which the connection device is connected and a power supply capacity of the second battery is a first threshold value or less.

8. The electronic device according to claim 7,
   wherein the processor is configured to perform control to stop supplying power to the first circuit from the first battery and to supply power to the power supply circuit from the first battery, in a state in which the connection device is connected and the power supply capacity of the second battery is the first threshold value or less.

9. The electronic device according to claim 8,
   wherein the processor is configured to perform control to supply power supplied from the first battery to the power supply circuit via a power supply path provided inside the connection device, in a state in which the connection device is connected and the power supply capacity of the second battery is the first threshold value or less.

10. The electronic device according to claim 7,
    wherein the processor is configured to perform control to supply power supplied from the first battery to the power supply circuit via a power supply path provided inside the connection device, in a state in which the connection device is connected and the power supply capacity of the second battery is the first threshold value or less.

11. The electronic device according to claim 1, further comprising:
    a power receiving unit capable of receiving power from an external power feed device,
    wherein the processor is configured to perform control to supply power to the first circuit from the external power feed device, in a state in which the connection device is connected and the power receiving unit is supplied with power from the external power feed device.

12. The electronic device according to claim 11,
    wherein the processor is configured to perform control to stop supplying power to the first circuit from the first battery and to supply power to the first circuit from the external power feed device, in a state in which the connection device is connected and the power receiving unit is supplied with power from the external power feed device.

13. The electronic device according to claim 12,
    wherein the processor is configured to perform control to distribute and supply power supplied from the external power feed device to the first circuit and the power supply circuit in a case where a power supply capacity of the external power feed device is a second threshold value or more.

14. The electronic device according to claim 1, further comprising:
    a power receiving unit capable of receiving power from an external power feed device,
    wherein the processor is configured to perform control to supply power to the power supply circuit from the external power feed device, in a state in which the connection device is connected and the power receiving unit is supplied with power from the external power feed device.

15. The electronic device according to claim 1,
    wherein the electronic device is an imaging device, and the connection device is a grip.

16. An electronic device to which a connection device having a second battery and a first circuit is connectable, the electronic device comprising:

a first battery;

a power supply circuit; and a processor, wherein the processor is configured to perform control to supply power to the first circuit from only the first battery out of the first battery and the second battery in a state in which the connection device is connected.

17. A connection device that is connectable to an electronic device having a first battery and a power supply circuit, the connection device comprising:

a second battery; and a first circuit, wherein power is supplied to the first circuit from the first battery, and power is supplied to the power supply circuit from the second battery, in a state in which the connection device is connected to the electronic device.

18. A system comprising:

an electronic device having a first battery and a power supply circuit;

a connection device that has a second battery and a first circuit and is connectable to the electronic device; and a processor, wherein the processor is configured to:
perform control to supply power to the first circuit from the first battery and to supply power to the power supply circuit from the second battery, in a state in which the connection device is connected to the electronic device.

19. A power supply method using the system according to claim 18, the method comprising:

performing control to supply power to a first circuit from a first battery and to supply power to a power supply circuit from a second battery, in a state in which a connection device having the second battery and the first circuit is connected to an electronic device having the first battery and the power supply circuit.

20. A non-transitory computer readable recording medium storing a power supply program causing a processor to function as the system according to claim 18, the program causing the processor to execute:

performing control to supply power to a first circuit from a first battery and to supply power to a power supply circuit from a second battery, in a state in which a connection device having the second battery and the first circuit is connected to an electronic device having the first battery and the power supply circuit.

\* \* \* \* \*